United States Patent
Kleiman et al.

(10) Patent No.: US 8,852,780 B2
(45) Date of Patent: Oct. 7, 2014

(54) BATTERY PACK SUPPORT WITH THERMAL CONTROL

(75) Inventors: Richard Kleiman, Indianapolis, IN (US); Steve Alford, Alexandria, IN (US); David Garner, Indianapolis, IN (US); Len Wolf, Greenville, SC (US)

(73) Assignee: Enerdel, Inc., Greenfield, IN (US)

( * ) Notice: Subject to any disclaimer, the term of this patent is extended or adjusted under 35 U.S.C. 154(b) by 776 days.

(21) Appl. No.: 13/069,270

(22) Filed: Mar. 22, 2011

(65) Prior Publication Data

US 2012/0244392 A1   Sep. 27, 2012

(51) Int. Cl.
| | |
|---|---|
| *H01M 10/50* | (2006.01) |
| *H01M 2/10* | (2006.01) |
| *H01M 10/6556* | (2014.01) |
| *H01M 10/613* | (2014.01) |
| *H01M 10/615* | (2014.01) |
| *H01M 10/627* | (2014.01) |

(52) U.S. Cl.
CPC ...... *H01M 10/5004* (2013.01); *H01M 10/5057* (2013.01); *H01M 10/5018* (2013.01); *H01M 10/5006* (2013.01); *Y02E 60/12* (2013.01)
USPC .......................................... 429/120; 429/100

(58) Field of Classification Search
USPC ................ 429/71, 72, 82, 83, 120, 100
See application file for complete search history.

(56) References Cited

U.S. PATENT DOCUMENTS

| | | | |
|---|---|---|---|
| 5,756,227 A | 5/1998 | Suzuki et al. | |
| 6,864,013 B2 * | 3/2005 | Gow et al. ............... | 429/120 |
| 7,858,220 B2 * | 12/2010 | Shimizu ................... | 429/120 |
| 2001/0031392 A1 | 10/2001 | Ogata et al. | |
| 2003/0232239 A1 | 12/2003 | Corrigan et al. | |
| 2005/0170240 A1 | 8/2005 | German et al. | |
| 2006/0068267 A1 | 3/2006 | Frank et al. | |
| 2008/0193830 A1 | 8/2008 | Buck et al. | |
| 2009/0214941 A1 | 8/2009 | Buck et al. | |
| 2009/0258289 A1 | 10/2009 | Weber et al. | |
| 2010/0261046 A1 | 10/2010 | German et al. | |
| 2012/0231319 A1 | 9/2012 | Buck et al. | |

OTHER PUBLICATIONS

International Search Report and Written Opinion in PCT/US2012/029902, Sep. 2012, 8 pgs.

* cited by examiner

*Primary Examiner* — Patrick Ryan
*Assistant Examiner* — Julian Anthony
(74) *Attorney, Agent, or Firm* — Faegre Baker Daniels LLP

(57) ABSTRACT

A battery support includes a rigid, thermally conductive upper plate having first and second opposing major surfaces. The support also includes at least one lower plate disposed on the second major surface and comprising a plurality of protrusions extending away from the second major surface and in fluid communication, the plurality of protrusions defining a first manifold portion, a second manifold portion, and plurality of non-linear passages extending along a first direction between the first and second manifolds, a cross-section of the plurality of protrusions defining the plurality of non-linear passages comprising a curved portion with a width that is at least twice the height of the curved portion. The support further includes a first conduit in fluid communication with the first manifold portion and a second conduit in fluid communication with the second manifold portion.

21 Claims, 5 Drawing Sheets

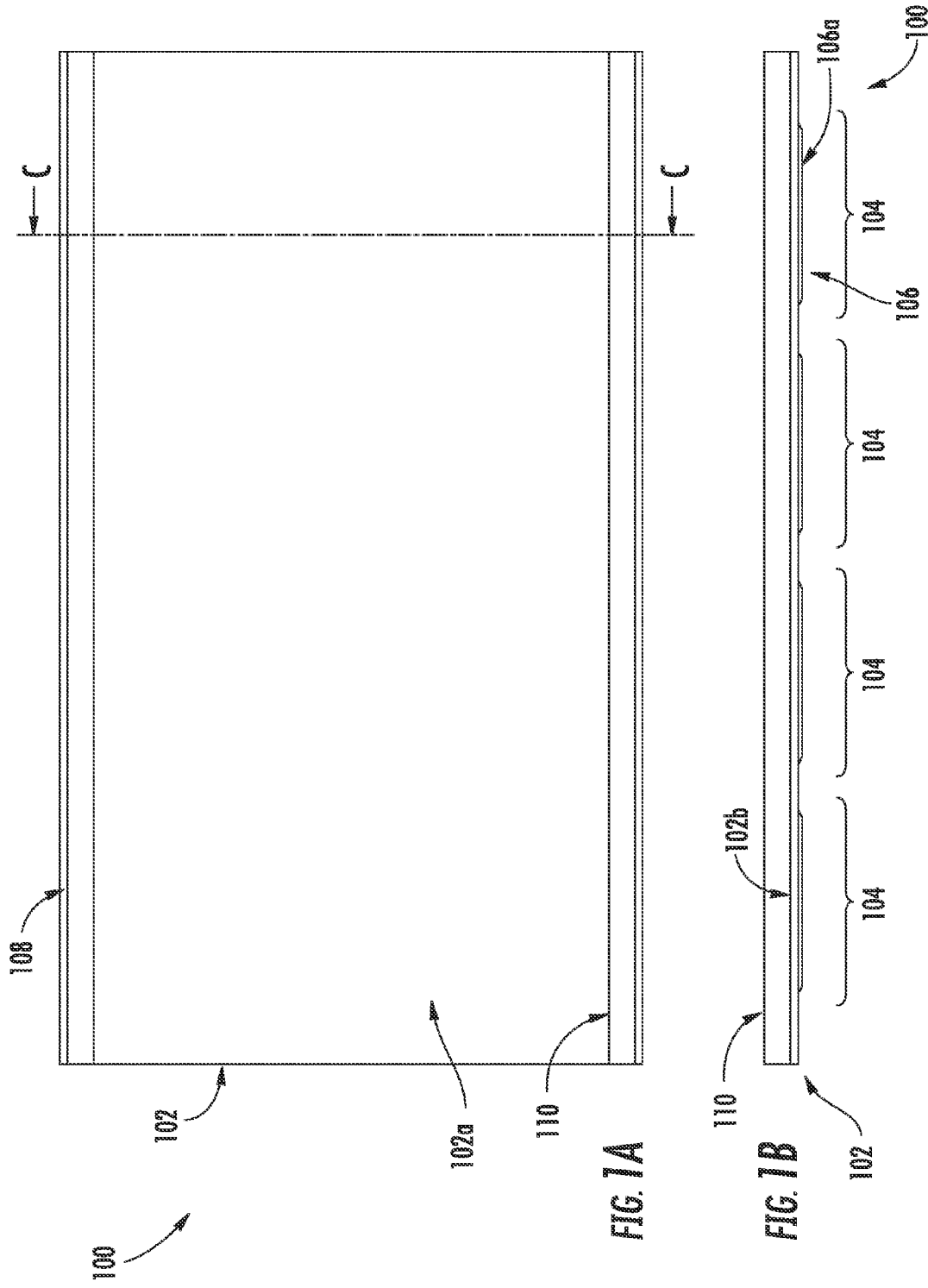

BATTERY PACK SUPPORT WITH THERMAL CONTROL

FIELD OF THE INVENTION

The present invention relates to battery pack supports, and more specifically to systems and methods for providing thermal control for battery packs using a battery pack support.

BACKGROUND

Lithium (Li) ion battery packs, consisting of one or more Li ion cells, have found widespread adoption for various applications, including renewable energy systems and energy distribution systems. In particular, the high energy, high power density, and potential low cost of Li ion battery packs have made them particularly attractive in these applications. However, a major concern with Li ion battery packs is thermal management. That is, if the temperature of the battery pack is not maintained within a specific temperature range (e.g., −10° C. to 50° C.), the performance and lifetime of the Li ion cells therein can degrade significantly. Even worse, variations in temperature can cause different Li ion cells within a same battery pack or different battery packs in a same device to operate differently or unpredictably.

SUMMARY

Embodiments of the invention concern battery pack supports for thermal control of battery packs. In a first embodiment of the invention, a battery support is provided. The support includes a rigid, thermally conductive upper plate having first and second opposing major surfaces. The support further includes at least one lower plate disposed on the second major surface and comprising a plurality of protrusions extending away from the second major surface and in fluid communication. In the support, the plurality of protrusions define a first manifold portion, a second manifold portion, and plurality of non-linear passages extending along a first direction between the first and second manifolds. A cross-section of the plurality of protrusions defining the plurality of non-linear passages includes a curved portion with a width that is at least twice the height of the curved portion. The support further includes a first conduit in fluid communication with the first manifold portion and a second conduit in fluid communication with the second manifold portion.

In a second embodiment of the invention, a method of providing thermal control for a battery pack includes disposing a battery pack on a first major surface a substantially rigid, thermally conductive upper plate. The method further includes directing a fluid through a plurality of non-linear paths along a second major surface of the upper plate, where the non-linear passages are configured to reduce or prevent boundary layer formation for the fluid. The method also includes regulating a temperature of the battery pack by adjusting at least one of a flow rate and a temperature of the fluid.

In the various embodiments, a reduction or elimination of the boundary layer can be provided by configuring the curved portion that defines the cross-section of the non-linear passages. For example, in some embodiments, a width of the curved portion is at least 4 times the height. In some embodiments, the curved portion can be configured to define an area of a circular segment. Further, the height of the circular segment can be selected to be is less than or equal to about 80% of the radius associated with the circular segment.

BRIEF DESCRIPTION OF THE DRAWINGS

FIG. 1A is a top view of an exemplary battery pack support in accordance with an embodiment of the invention.

FIG. 1B is a side view of the battery pack support of FIG. 1A.

DETAILED DESCRIPTION

Figure 1C:
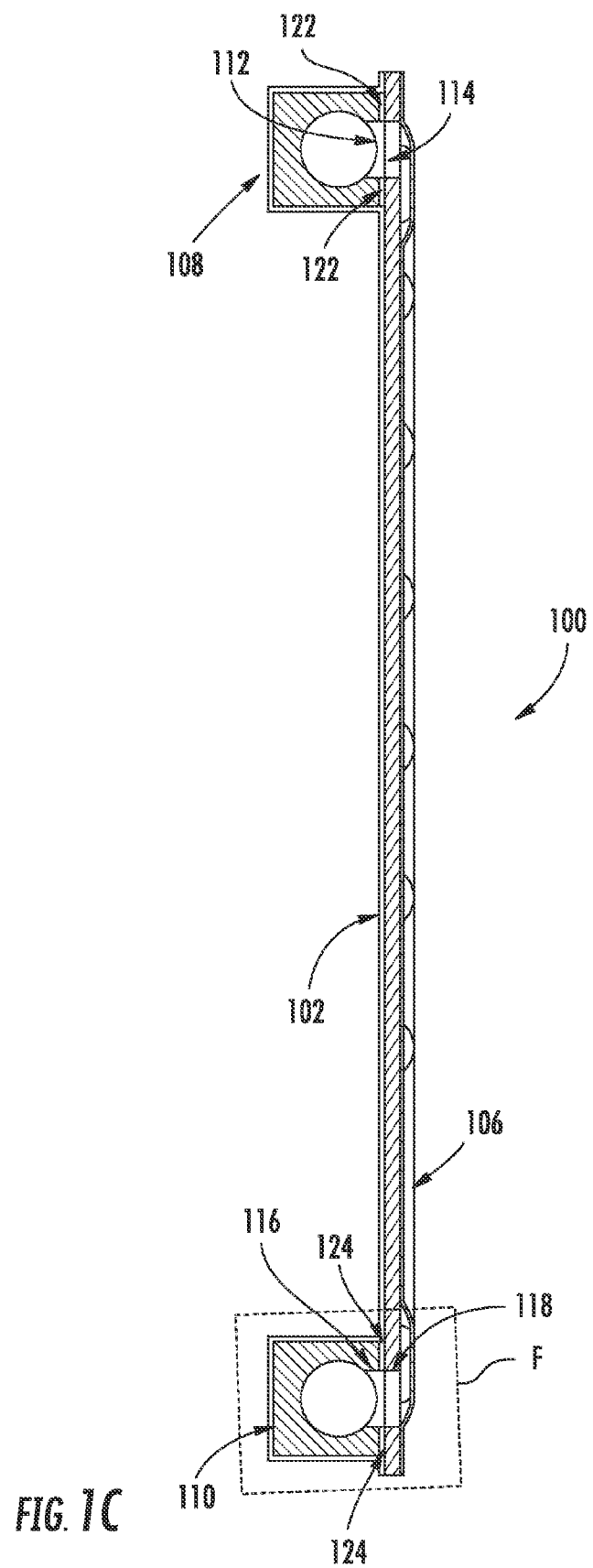
FIG. 1C is a cross-sectional view of the battery pack support of FIG. 1A through outline C-C.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders or concurrently with other acts or events. Furthermore, not all illustrated acts or events are required to implement a methodology in accordance with the present invention.

As described above, a principal concern with battery packs is thermal management for purposes of providing reliable performance characteristics. However, one of the difficulties with thermal management of battery packs, such as Li ion battery packs, is the size, weight, or capacity tradeoff typically associated with providing an adequate heating or cooling system for the battery pack. For example, one traditional option for thermal control of battery packs has been to provide additional elements or components to externally heat and cool the battery pack. However, such external cooling devices are generally inefficient, bulky, and contribute a significant amount of additional weight to the overall system. More recently, battery packs have been fabricated to include internal structures, such as cooling channels or passages, for cooling the cells directly. However, although such internally cooled systems may be more effective with respect to heating and cooling of a battery, they often require either reduction in the number of cells to maintain battery pack size and weight, resulting in a reduction in battery pack capacity.

In view of these limitations, embodiments of the invention provide a new battery pack support configuration. Such a battery pack support can be configured to provide a location for mechanically supporting a battery pack in a device and provide efficient cooling and heating of the battery pack, while maintaining good isolation between fluids and the battery pack. Additionally, such a battery pack support can have a small profile and can be configured to contribute a minor amount of additional weight. One exemplary configuration for a battery pack support in accordance with an embodiment of the invention is described below with respect to FIGS. 1A-1F.

FIGS. 1A-1F show various views of an exemplary battery pack support 100 configured in accordance with an embodiment of the invention. As shown in FIGS. 1A-1F, the support 100 includes an upper plate 102 having a first major surface 102a and a second major surface 102b.

In the support 100, the upper plate 102 serves at least two major functions. First, the upper plate 102 provides the structure for mechanically supporting a battery pack (not shown) in a battery-operated device (not shown). In particular, the support 100 can be attached or positioned in the battery operated device and a battery pack can be fastened to the first major surface 102a. Thus, the upper plate 102 can include additional structures and features (not shown) for fastening a battery pack to the upper plate 102. For example, the upper plate 102 can include features for attaching the battery pack via one or more fastening devices, including, but not limited to, screws bolts, clamps, and straps, to name a few. In some embodiments, the upper plate 102 can also include features on the first major surface 102a that can be used to register or locate the battery modules. In such embodiments, such features can be machined, molded, attached or fastened onto this surface.

In addition to supporting the battery pack, the upper plate 102 also serves as a cooling or heating element for the battery pack. Accordingly, in the various embodiments of the invention, the upper plate 102 can consist of a substantially rigid material with high thermal conductivity. For example, the upper plate 102 can consist of a metal, including, but not limited to, corrosion resistant metals such as aluminum, copper, brass, or stainless steel. Other materials include thermally conductive plastics/polymers or composites. However, the various embodiments are not limited to any of the materials listed above, and any other substantially rigid material with high thermal conductivity can be used without limitation.

In addition to the upper plate 102, the support 100 can also include at least one lower plate 104 positioned flush to second major surface 102b of upper plate 102. In the various embodiments, the lower plate 104 is used to define passages for directing a heating or cooling fluid through the support 100. As used herein, the term "fluid" refers to gases or liquids. In particular, as shown in FIGS. 1A-1F, the lower plate 104 is configured to include a set of connected protrusions 106. The protrusions 106 in the lower plate 104 define at least a first manifold 106a, a second manifold 106b, and non-linear passages 106c for providing a fluid connection between the manifolds 106a and 106b. As used herein, the "non-linear passage" refers to a passage including one or more curves, turns, or changes in direction.

In the various embodiments, the non-linear passages are dimensioned and arranged to reduce or prevent boundary layer formation of fluid in the non-linear passages 106c. Further, the non-linear passages 106c can also be configured to reduce or eliminate a pressure drop. For example, the passages can have a semicircular cross-section profile and have direction changes that extend along a swept curve. However, the various embodiments are not limited to the specific configuration described herein.

Figure 1D:
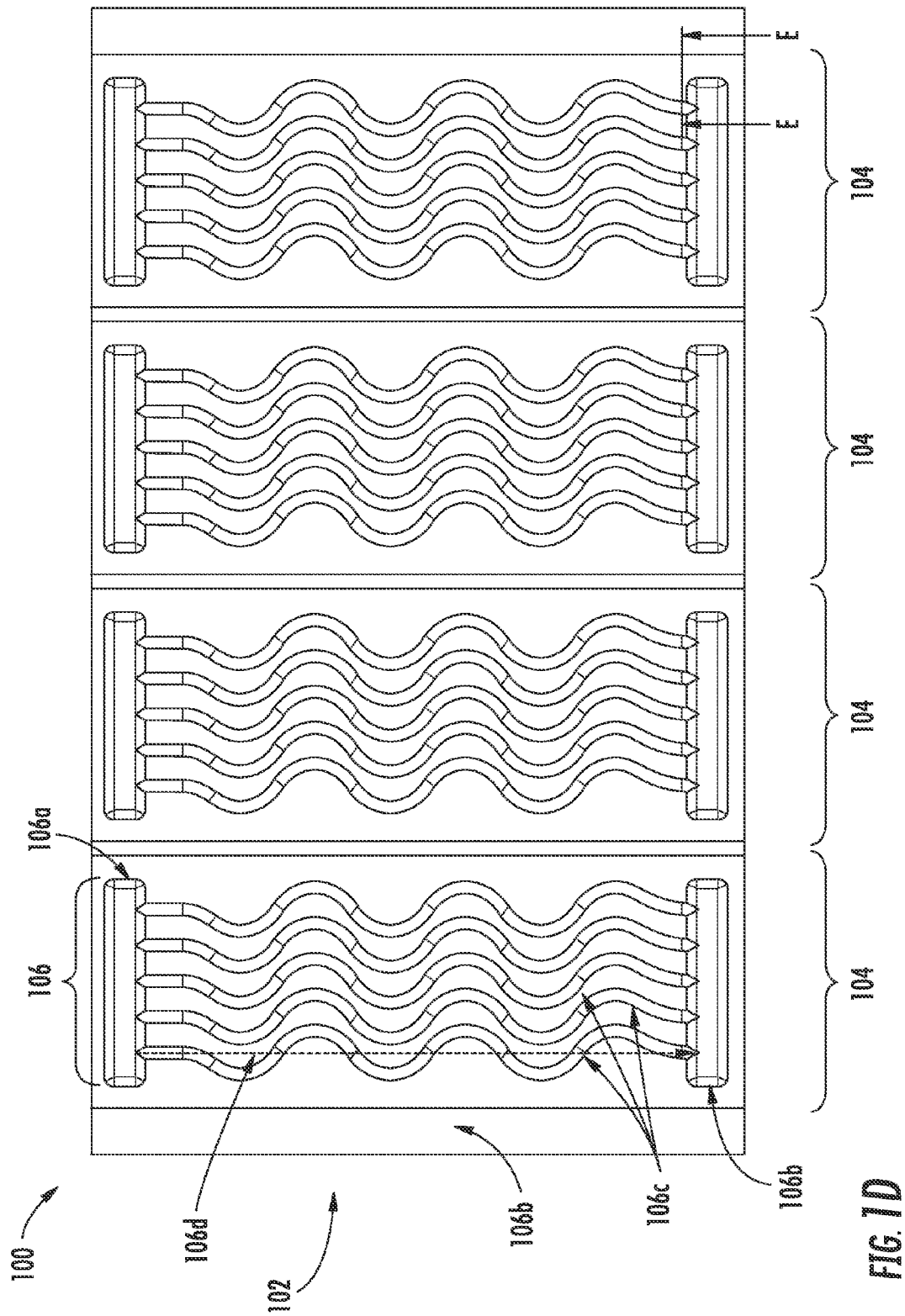
FIG. 1D is a bottom view of the battery pack support of FIG. 1A.
Figure 1E:
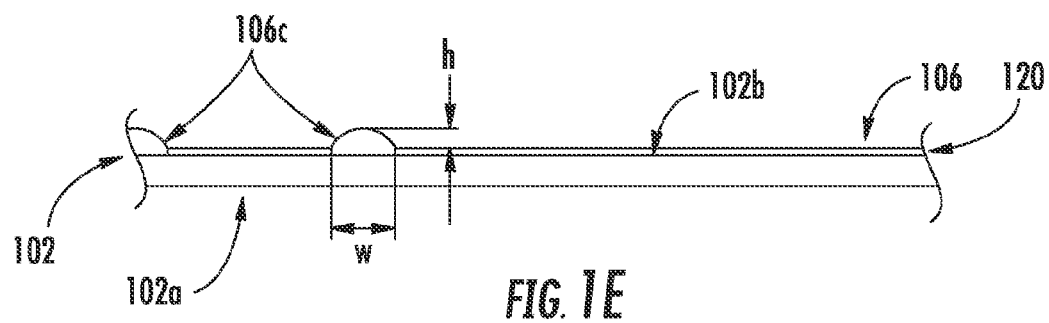
FIG. 1E is cross-sectional view of the battery pack support of FIG. 1A through the partial cutline E-E in FIG. 1D.
Figure 1F:
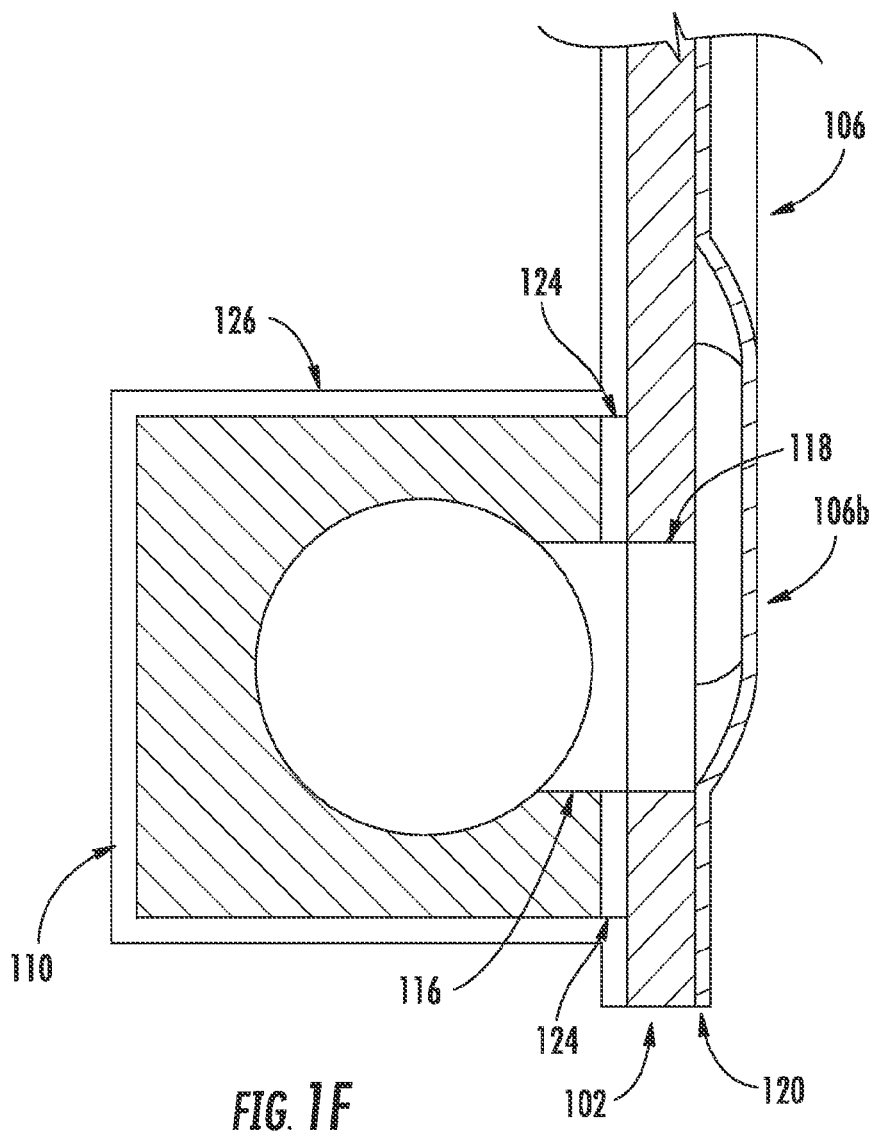
FIG. 1F is a close-up view of portion of the battery pack support of FIG. 1A as indicated in FIG. 1C.

As shown in FIG. 1D, the first manifold 106a, the second manifold 106b, and the non-linear passages 106c can be arranged such that the manifolds 106a and 106b are parallel to each other and the non-linear passages 106c extend primarily in a second direction perpendicular to each of the manifolds 106a and 106b.

In FIG. 1D, the support 100 is illustrated as including multiple lower plates 104, each having a single set of connected protrusions 106. However, the invention is not limited in this regard. For example, in some embodiments of the invention, a single lower plate 104 can be provided with multiple sets of protrusions 106. In other embodiments, multiple lower plates 104 can be used, but one or more of the lower plates 104 can include two or more sets of protrusions 106.

In the various embodiments, a lower plate 104 with a set of protrusions 106 can be fabricated from any number of different materials. In general, the selection of the material type and fabrication process can depend on cost restrictions, weight restrictions, and reliability requirements. For example, in the case of a battery pack support for a vehicle or other device operating under various environmental conditions, a low-weight material that is resistant to corrosion can be used, such as some corrosion resistant metals or polymers. For example, such materials can include aluminum, zinc, polyethylene, polyamide, polypropylene, or fiberglass. However, as the lower plate 104 is not configured to support the battery pack, a thinner, higher weight can also be used.

The lower plate 104 with the protrusions 106 can be fabricated in a variety of ways. For example, in some embodiments, the protrusions 106 can be embossed. That is, a substantially planar portion defining the lower plate 104 is formed first, and the protrusions 106 are then pressed or stamped into the lower plate 104 using a die or mold in combination with pressure, heat, or both. Alternatively, the lower plate 104 can be formed using a molding or extrusion process. The process to be used for forming the lower plate 104 can depend on (i) the type of material being used; (ii) the level of efficiency and productivity required; or (iii) both. For example, some types of materials can be more efficiently processed via embossing, such as metal sheets. In contrast, other types of materials may require or can be more efficiently processed via molding techniques, such as polymers, carbon composites, or fiberglass materials. However, the various embodiments are not limited to any particular method for forming the lower plate 104, and any other methods can be used without limitation.

In the embodiment illustrated in FIG. 1D, each of the non-linear passages 106c are shown as consisting of a plurality of semi-circular portions defining a serpentine passage between the manifolds 106a and 106b. As used herein, a "serpentine passage" is a non-linear passage that extends along a path between the manifolds 106a and 106b having no portion traveling in a direction opposite to a linear path between a beginning and an end of the non-linear passage. In some embodiments, the path can be symmetric with respect to this linear path. That is, turns or other changes in the non-linear passage can be distributed uniformly about the linear path. For example, the non-linear path can be configured to follow a zigzag or sinusoidal pattern with respect to the linear path between a beginning and an end of the non-linear passage. Such a path is illustrated in FIG. 1D, in which each the non-linear passages 106c extends along a linear path 106d between the manifolds 106a and 106b and consists of a series of semicircular sections defining a zigzag or sinusoidal path with respect to the path 106d. However, the various embodiments are not limited in this regard and any other types of serpentine passages can be used in the various embodiments without limitation. For example, the serpentine passage can be asymmetric with respect to the linear path 106d.

Additionally, as illustrated in FIG. 1D, the non-linear passages 106c are shown as being configured to be nested or interlocking and being substantially identical. As used herein with respect to the non-linear passages 106c, the terms "nested" or "interlocked" refer to configurations in which one non-linear passage fits into at least a portion of a space between another of the non-linear passages to provide a more compact arrangement of the non-linear passages. However, the various embodiments are not limited in this regard. For example, at least one of the non-linear passages 106c in the lower plate 104 can be different than the others. Further, at least one of the non-linear passages 106c in the lower plate 104 can be non-nested. However, the nested arrangement illustrated in FIG. 1D can provide a more compact arrangement of non-linear passages, allowing a larger number of non-linear passages in the lower plate 104 without the need to increase a size of the tower plate 104.

In the various embodiments of the invention, the height of the protrusions 106, and in particular, the protrusions associated with non-linear passages 106c, can be selected so as to minimize the formation of a boundary layer when a fluid flows through the non-linear passages 106c. Further, the protrusions 106 can be configured to reduce pressure drops along the length of each of the passages based on the type of fluid to be used and a desired flow rate of the fluid. As a result, more effective heating or cooling of the upper plate 102 and the battery pack can be provided. In particular, the protrusions 106 associated with the non-linear passages 106c can be molded or embossed using a curved shape to cause the non-linear passages 106c to have a width (w) that is greater than about twice its height (h), as designated in FIG. 1E. For example, the non-linear passages 106c can define a portion of a circle (i.e., circular segment), an ellipse, or an oval. In some embodiments, the width can be substantially larger than the height. For example, in the case of a non-linear portion forming a circular segment, the height cat be selected to be less than or equal to about 80% of the radius of the associated circle to provide a width that is at least about four times greater than the height (i.e., w>4 h).

Further, the dimensions and arrangement of the non-linear passages 106c can be selected so as to limit the size for the support 100. For example, the height of the non-linear passages 106c can be less than or equal to the thickness of the upper plate 102. Additionally, the dimensions of the upper plate 102 and the lower plate 104 can be selected to provide a small profile. For example, in some embodiments, the total thickness of the support 100 cat be at least 50 times less than a length of the upper plate 102.

In addition to the upper plate 102 and the lower plate 104, the support 100 can further include a first conduit 108 and a second conduit 110 for circulating heating or cooling fluids in and out of the support 100. The conduits 108 and 110 can be configured to include or mate with one or more components for coupling conduits to a source of heating or cooling fluids for the support 100. For example, such components can include adapters, connectors, tubing, and any other components for coupling the conduits 108 and 110 to a heating or cooling fluid source (not shown). The conduits 108 and 110 are also configured to be in fluid communication with the manifolds 106a and 106b, respectively.

Figure 2:
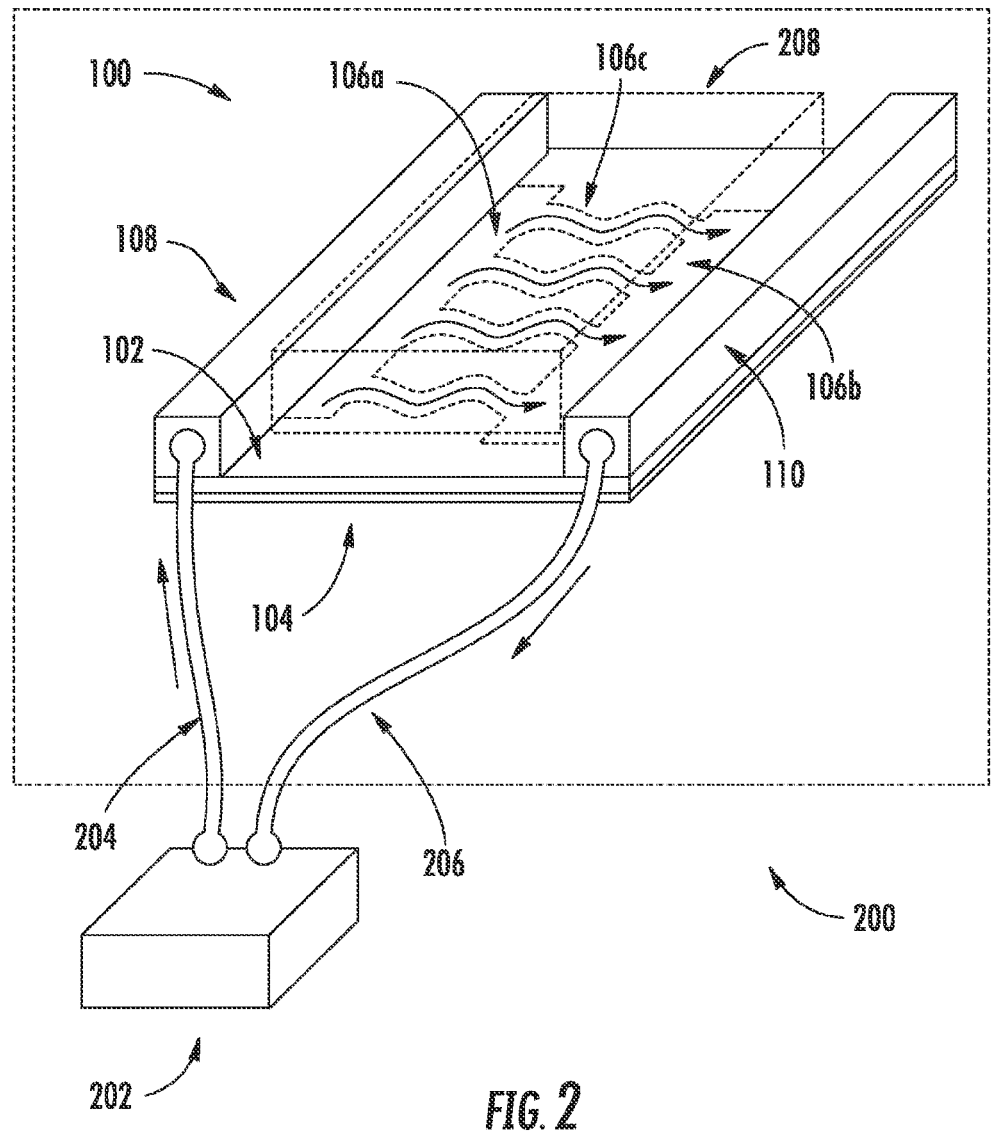
FIG. 2 is a schematic of a battery operated system configured in accordance with an embodiment of the invention.

Operation of the support 100 is illustrated in FIG. 2, FIG. 2 is a schematic of a battery operated system 200 including a support 100 in accordance with an embodiment of the invention. In operation, a fluid source 202 is coupled to at least one of the conduits 108 and 110. For example, as shown in FIG. 2, an inlet 204 and an outlet 206 are provided for coupling the fluid source 202 to the conduits 108 and 110, respectively. Thereafter, a heating or cooling fluid is directed via the inlet 204 into the conduit 108. As described above, the conduit 108 is in fluid communication with the manifold(s) 106a. As a result, the fluid is directed by the first conduit 108 into the manifold(s) 106a. Thereafter, the fluid in the manifold(s) 106a is directed through the non-linear passages 106c to the second manifold(s) 106b, as shown in FIG. 2. The non-linear passages 106c permit the fluid to reach a significant portion of the lower plate 104 without the need to provide a large number of passages. Further, the flow of fluids with little or no boundary layer through the support 100 causes the upper plate 102 to be cooled or heated without formation of a significant gradient in temperature.

Thus, the upper plate 102 provides substantially uniform cooling or heating of the battery 208 mounted thereon. As described above, the second conduit 110 is fluid communication with the manifold(s) 106b. Thus, after the fluid then travels through the non-linear passages 106c and into the manifold(s) 106b, the fluid is directed into the second conduit 110. Finally, the fluid travels out of the support 100 via the outlet 206.

In some embodiments, a recirculation system can be provided. That is, the fluid is reused. However, the invention is not limited in this regard and the fluid in the outlet 206 can be discarded. Further, although a single inlet, outlet, and fluid source are illustrated in FIG. 2, the invention is not limited in this regard. In the various embodiments, the number of each of these can vary. Additionally, separate inlets, outlets, and fluid sources can be provided for cooling versus heating. Finally, although the fluid source 202 is shown as being outside of the battery operated system 200, the invention is not limited in this regard. For example, in vehicular or mobile applications, the fluid source 202 can be located within a battery operated system.

Referring back to FIGS. 1A-1F, the conduits 108 and 110 can be coupled to the manifolds 106a and 106b in a variety of ways. For example, as shown in FIGS. 1A-1F, the conduits 108 and 110 can be disposed on a first major surface 102a of the upper plate 102. In this configuration, the upper plate 102 can then be configured to include at least one first manifold opening 114 to provide access to the first manifold 106a and at least one second manifold opening 118 to provide access to the second manifold 106b. In turn, the first conduit 108 can include at least a first conduit opening 112 configured to mate with the first manifold opening 114 and the second conduit 110 can include at teas one second conduit opening 116 to mate with the second manifold opening 118. However, the various embodiments are not limited to such a configuration. In other configurations, the conduits 108 and 110 can be disposed on the lower plate 104 or even along an edge of the plates 102 and 104. Additional sections can then be provided to provide fluid communication between the conduits 108 and 110 and the manifolds 106a and 106b, respectively.

The conduits 108 and 110 can be formed in a variety of shapes. For example, the conduits 108 and 110 are each shown as having a rectangular outer shape and a circular inner shape to facilitate fluid flow and to secure of a battery pack in the space between the conduits 108 and 110. However, the invention is not limited in this regard and any other inner or outer shapes can be used without limitation. Thus, the outer shape can be non-rectangular and the inner shape can be non-circular.

Although FIGS. 1A-1F illustrate only two conduits 108 and 110 for supplying fluid flow for various manifolds, the invention is not limited in this regard. For example, in some embodiments, multiple conduits can be provided for directing fluids in or out of the support 100. In another example, multiple conduits can be used to separate heating and cooling. That is, different sets of manifolds and non-linear passages can be used to provide cooling and heating. Accordingly, a first set of conduits can be associated with heating of the support 100 and a second set of conduits can be associated with cooling of the support 100.

Additionally, the conduits can be formed from a variety of materials. For example, in some configurations, the conduits 108 and 110 can be formed using materials with poor thermal conductivity to prevent a large thermal gradient from forming across the support 100. In another configuration, thermally conductive materials can be used if the temperatures of the fluid entering the conduit 108 and leaving the second conduit 110 are not significantly different. For example, such materials can include aluminum, zinc, polyethylene, polyamide, polypropylene, or fiberglass, to name a few. However, the various embodiments are not limited in this regard and any other materials of this type not listed here can also be used. In yet other embodiments, an insulation layer (not shown) can be provided for the conduits 108 and 110.

As described above, isolation can be provided between fluids in the conduits 108 and 110 or between the plates 102 and 104 and a battery pack mounted in or on the support 100. For example, between the plates 102 and 104, a first mechanical seal 120 can be provided to ensure that fluids are restricted to the manifolds 106*a* and 106*b* and the non-linear passages 106*c*. In addition to the mechanical seal 120, mechanical seals 122 and 124 can also be provided to ensure that a battery pack disposed on the support 100 is not exposed to fluids traveling between the conduits 108 and 110 and the manifolds 106*a* and 106*b*. Additionally, one or more of the mechanical seals 120, 122, 124 can also be used to provide mechanical fastening of the lower plate 104, the first conduit 108, or the second conduit 110 to the upper plate 102 of the support 100.

In the various embodiments, such mechanical seals can be provided in a variety of ways. For example, in some configurations, the mechanical seals 120, 122, or 124 can be gaskets, o-rings, or any other type of mechanical seal device. These gaskets can be maintained in place using one or more adhesive materials or one or more fasteners (not shown). In other configurations, the mechanical seals 120, 122, or 124 can be provided using an adhesive sealant, such as an epoxy or other similar adhesive sealant. However, the various embodiments are not limited to the mechanical seals described above. Rather, the various components of the support 100 can be configured to include or support the use of any other type of mechanical seal.

Alternatively or in addition to mechanical seals 120, 122 and 124, at least one additional sealing layer 126 can also be provided for the support 100. In particular, the sealing layer 126 ea be a layer of material disposed over the first major surface 102*a* of the upper plate 102, including any of the conduits 108 and 110 disposed on the first major surface 102*a*. In such configurations, the seating layer 126 can be configured to be substantially electrically insulating in order to provide additional electrical isolation between a battery pack and any fluids in the support 100. Additionally, the sealing layer 126 can be configured to provide a surface with a high coefficient of static friction to aid in securing of the battery pack to the support 100. Further, the sealing layer 126 can be configured to have a relatively high thermal conductivity to allow the upper plate 102 to provide sufficient heating or cooling of the battery pack. Alternatively, the sealing layer 126 can be configured to be of a sufficiently low thickness so as not to significantly hinder or retard the exchange of heat between the battery pack and the upper plate 102. For example, the sealing layer 126 can be a thin layer of an epoxy, rubber, or other similar material, such as a thermally conductive acrylic or silicon rubber.

In the various embodiments of the invention, the support 100 can be configured to operate with a variety of cooling and heating fluids, including gases and liquids. Gases can include air, inert gases, and steam. However, any other gases can be used without limitation the various embodiments. Such gases can be provided to the support 100 via convective airflow or forced circulation, based on the particular cooling or heating requirements for the battery pack. Liquids can include liquids, such as water or glycol, molten solids, liquefied gases, and nanofluids (i.e., a liquid with suspended nanoparticles). Such gas or liquids can be supplied by a heater or chiller device (not shown) coupled to the conduits 108 and 110.

In the various embodiments, the type of fluid can depend on the various materials forming the support 100. That is, the type of fluid can be selected such that is it relatively unreactive with the various components of the support 100. Additionally, the fluid can include one or more anti-corrosive agents to prevent or limit the reactivity of the fluid with the various components of the support 100. Alternatively, the various components of the support 100 can be configured to be relatively unreactive with the fluid. For example, the materials used to make the support 100 can be coated or treated in order to resist corrosion by the fluid. Alternatively, the interior of the conduits 108 and 110, the manifolds 106*a* and 106*b*, and the non-linear passage 106*c* can be coated with a corrosion inhibitor.

Examples

The following non-limiting Examples serve to illustrate selected embodiments of the invention. It will be appreciated that variations in proportions and alternatives in elements of the components shown will be apparent to those skilled in the art and are within the scope of embodiments of the present invention.

The system illustrated in FIGS. 1A-1F was fabricated with the following dimensions (in mm):
Upper plate: 460.0×811.2×3.2
Lower plates: 176.4×460.0×0.6
Non-linear passage height (h): ~2.0
Non-linear passage width (w): ~4.0

To test the effectiveness of this system at an ambient temperature of 40° C. for a typical rechargeable battery system for a Think City™ electric vehicle, two of these systems were plumbed in series to cool the battery system using an inlet coolant temperature of 20° C. This test system was found to provide approximately 620 watts of cooling when tested at 40° C. ambient temperature for typical power cycles. As a result, assuming that delta T is an average 2.5° C. during cyclic testing (repeat 1° C. discharge and 0.5° C. charge 5 times to simulate a rental vehicle duty cycle), this amount of cooling prevented the battery pack from going into a current limiting mode, despite battery heating occurring during repeated 1° C. discharges. Details of this testing follows.

This testing involved soaking the battery pack for 24 hours at an elevated ambient temperature (30° C. for 24 hours at roughly 80% SOC (State of Charge). The battery pack was then placed in a thermal chamber. A battery cycler was then used to simulate the vehicle load and to recharge the battery. The pack was then trickle charged to ~100% SOC. Thereafter, a discharge test was begun and the ambient temperature was raised to 40° C. Raising the ambient from 30° C. to 40° C. simulates the vehicle coming out of an overnight soak at 30° C. and being charged for a daytime 40° C. environment.

The battery coolant (50/50 mix of ethylene glycol and water) was turned on for the pack. This was provided by an industrial chiller that controls flow rate (4 liters per minute)

and 20° C. EGW inlet temperature to the battery pack. The pack was then configured to undergo a 1° C. discharge (70 amps) for roughly 1 hour until it was near 0% SOC. Thereafter, a c/2 charge started, which lasted about two hours. To protect the battery, the cycler was configured to trickle charge the battery for the last 10-20% of the charge cycle until ~100% SOC was reached. The coolant to the battery was never turned off during the test. This cycle of discharge and charge was repeated 5 times. This charge discharge cycle was selected to evaluate severe driving conditions and in a 40° C. climate. Seven of these cycles were run before the test was ended. The testing proved that the battery support design disclosed herein can provide liquid cooling to the vehicle battery and allow it to perform in extreme warm weather climates without limiting current due to battery BMS thermistor temperatures forcing a current limiting condition. Generally, the battery BMS thermistor would begin to limit current at 45° C. and shuts down at 55° C.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A battery support, comprising:
   a rigid, thermally conductive upper plate having first and second opposing major surfaces, the upper plate supporting a battery on the upper surface;
   at least one lower plate disposed on the second major surface side of the upper plate and providing a plurality of protrusions extending away from the second major surface and in fluid communication, the plurality of protrusions defining a first manifold portion, a second manifold portion, and plurality of non-linear passages extending along a first direction between the first and second manifolds, a cross-section of the plurality of protrusions defining the plurality of non-linear passages having a curved portion with a width that is at least about twice the height of the curved portion, wherein the plurality of non-linear passages are spaced apart from the battery;
   a first conduit in fluid communication with the first manifold portion; and
   a second conduit in fluid communication with the second manifold portion.

2. The battery support of claim 1, wherein the width of the curved portion is at least about four times the height.

3. The battery support of claim 1, wherein the curved portion defines an area of a circular segment.

4. The battery support of claim 3, wherein the height of the circular segment is less than or equal to about 80% of the radius associated with the circular segment.

5. The battery support of claim 1, wherein the plurality of non-linear passages include a plurality of serpentine passages.

6. The battery support of claim 5, wherein the plurality of serpentine passages extend along zigzag paths.

7. The battery support of claim 1, wherein each of the plurality of non-linear passages includes a semi-circular portion.

8. The battery support of claim 1, wherein the plurality of passages are in a nested arrangement.

9. The battery support of claim 1, wherein each of the first and second manifold portions provides a passage extending along a second direction substantially perpendicular to the first direction.

10. The battery support of claim 9, wherein each of the first and second conduits extends along the second direction.

11. The battery support of claim 1, wherein the plurality of non-linear passages are positioned underneath the battery.

12. A battery support, comprising:
    a rigid, thermally conductive upper plate having first and second opposing major surfaces;
    at least one lower plate disposed on the second major surface and providing a plurality of protrusions extending away from the second major surface and in fluid communication, the plurality of protrusions defining a first manifold portion, a second manifold portion, and plurality of non-linear passages extending along a first direction between the first and second manifolds, a cross-section of the plurality of protrusions defining the plurality of non-linear passages having a curved portion with a width that is at least about twice the height of the curved portion;
    a first conduit in fluid communication with the first manifold portion; and
    a second conduit in fluid communication with the second manifold portion, wherein the first and second conduits are disposed on the first major surface, and wherein the upper plate provides at least one first manifold opening providing fluid communication between the first manifold and the first conduit and at least one second manifold opening providing fluid communication between the second manifold and the second conduit.

13. A battery support, comprising:
    a rigid, thermally conductive upper plate having first and second opposing major surfaces;
    at least one lower plate disposed on the second major surface and providing a plurality of protrusions extending away from the second major surface and in fluid communication, the plurality of protrusions defining a first manifold portion, a second manifold portion, and plurality of non-linear passages extending along a first direction between the first and second manifolds, a cross-section of the plurality of protrusions defining the plurality of non-linear passages having a curved portion with a width that is at least about twice the height of the curved portion;

a first conduit in fluid communication with the first manifold portion; and a second conduit in fluid communication with the second manifold portion, further comprising at least a first mechanical seal disposed between the first conduit and the first manifold, at least a second mechanical seal disposed between the second conduit and the second manifold, and at least a third mechanical seal disposed between the upper and lower plates.

14. A battery support, comprising:

a rigid, thermally conductive upper plate having first and second opposing major surfaces;

at least one lower plate disposed on the second major surface and providing a plurality of protrusions extending away from the second major surface and in fluid communication, the plurality of protrusions defining a first manifold portion, a second manifold portion, and plurality of non-linear passages extending along a first direction between the first and second manifolds, a cross-section of the plurality of protrusions defining the plurality of non-linear passages having a curved portion with a width that is at least about twice the height of the curved portion;

a first conduit in fluid communication with the first manifold portion; and a second conduit in fluid communication with the second manifold portion, further comprising a coating disposed over the first major surface.

15. A method of providing thermal control for a battery pack, comprising:

disposing a battery pack on a first major surface of a substantially rigid thermally conductive upper plate;

directing at least one fluid into a plurality of non-linear paths along a second major surface of the upper plate, the plurality of non-linear paths configured to reduce formation of a boundary layer and reduce a pressure drop along the plurality of the non-linear paths, the upper plate being positioned between the battery pack and the plurality of non-linear paths; and regulating a temperature of the battery pack by adjusting at least one of a flow rate and a temperature of the fluid.

16. The method of claim 15, further comprising the steps of: obtaining at least one lower plate providing a plurality of protrusions in fluid communication, the plurality of protrusions defining a first manifold portion, a second manifold portion, and plurality of non-linear passages extending along a first direction between the first and second manifolds, a cross-section of the plurality of protrusions defining the plurality of non-linear passages having a curved portion with a width that is at least about twice the height of the curved portion; attaching the lower plate to the second major surface of the upper plate so that the plurality of protrusions extend away from the upper plate; and directing the fluid through the protrusions.

17. The method of claim 16, wherein the width of the curved portion is at least about four times the height.

18. The method of claim 16, wherein the plurality of non-linear passages include a plurality of serpentine passages.

19. The method of claim 16, wherein the plurality of non-linear passages include a plurality of semi-circular portions.

20. The method of claim 16, wherein the plurality of non-linear passages are in a nested arrangement.

21. The method of claim 16, wherein each of the first and second manifold portions include passages extending along a second direction substantially perpendicular to the first direction.

\* \* \* \* \*